United States Patent [19]
Inaga

[11] 3,740,492
[45] June 19, 1973

[54] CARTRIDGE AND TAPE STRETCH PLACEMENT WITH BREAKS FOR ONE OR BOTH REELS

[75] Inventor: Katsu Inaga, Tokyo, Japan

[73] Assignee: Sony Corporation, Tokyo, Japan

[22] Filed: Apr. 12, 1972

[21] Appl. No.: 243,333

Related U.S. Application Data

[63] Continuation-in-part of Ser. No. 223,552, Feb. 4, 1972.

[30] Foreign Application Priority Data

Feb. 9, 1971 Japan .................................. 46/5505
Apr. 23, 1971 Japan ............................46/32510

[52] U.S. Cl. ................................179/100.2 ZA, 179/100.2 T; 242/55. 19 A; 274/4 E

[51] Int. Cl. ....................... G11b 15/66, G11b 23/04

[58] Field of Search ............ 179/100.2 Z, 100.2 T, 179/100.2 MD; 274/4 C, 4 D, 4 E; 242/55.19 A, 197, 200, 84.52, 156.2

[56] References Cited

UNITED STATES PATENTS

| | | | |
|---|---|---|---|
| 3,665,114 | 5/1972 | Hathaway | 179/100.2 Z |
| 3,660,614 | 5/1972 | Swain | 179/100.2 Z |
| 3,673,348 | 6/1972 | Larkin | 179/100.2 Z |
| 3,681,539 | 8/1972 | Eibensteiner | 179/100.2 T |
| 3,643,038 | 2/1972 | Sato | 179/100.2 T |
| 3,665,120 | 5/1972 | Larkin | 179/100.2 Z |
| 3,669,457 | 6/1972 | Kaisha | 179/100.2 Z |
| 3,674,942 | 7/1972 | Sugaya | 179/100.2 Z |

*Primary Examiner*—Bernard Konick
*Assistant Examiner*—Alfred H. Eddleman
*Attorney*—Lewis H. Eslinger, Alvin Sinderbrand and Curtis, Morris & Safford

[57] ABSTRACT

In an apparatus for magnetically recording and/or reproducing signals on a magnetic tape which is wound on, and extends between a pair of reels preferably contained in a cassette, reel support and drive members are engageable with the reels for rotating a selected one of the reels in the direction to wind the tape thereon, a tape loading and unloading device is engageable with the tape between the reels and is selectively operable for loading the tape on a cylindrical guide drum, that is, drawing the tape out of the cassette and into engagement with a portion of the periphery of the guide drum for scanning by at least one rotary magnetic head associated with the drum, and for unloading the tape, that is, removing the tape from the drum periphery, and brakes are provided which are engageable with the reel support and drive members and controlled for preventing rotation of both reels at the conclusion of each recording, reproducing, fast-forward or rewind operations of the apparatus, and for permitting rotation of only one of the reels during loading and unloading operations of the device provided therefor, so that the tape is unwound only from that one reel during each loading operation and rewound on that one reel during the next unloading operation.

15 Claims, 6 Drawing Figures

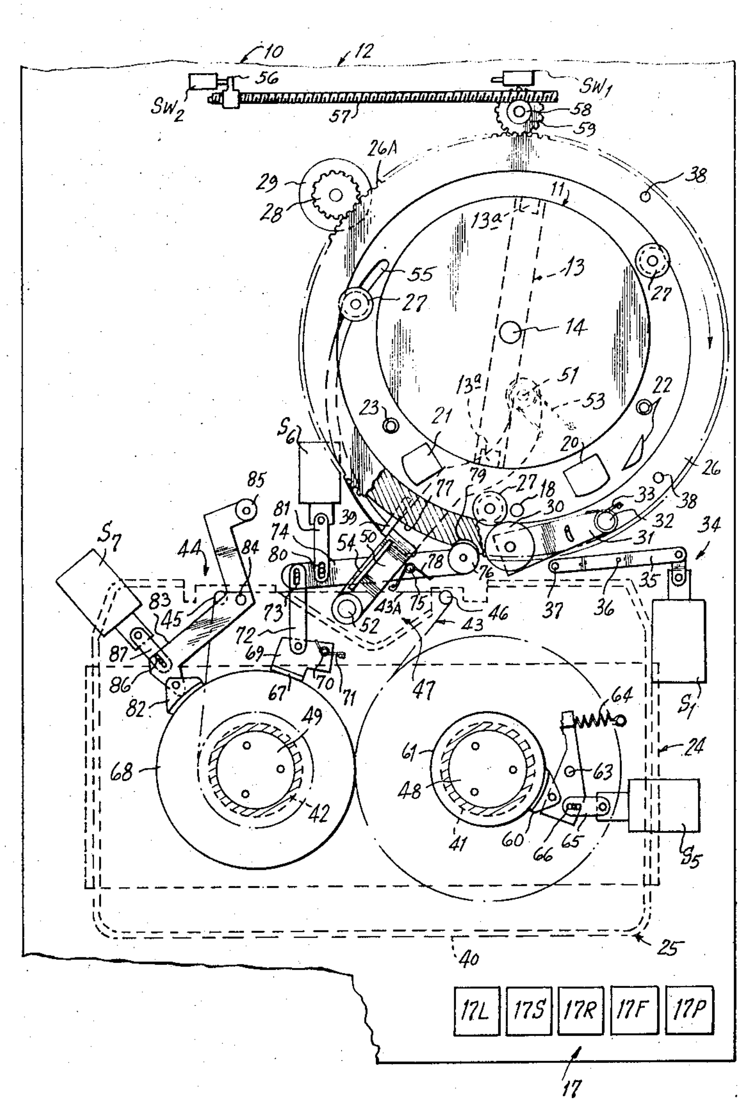

Patented June 19, 1973 3,740,492

6 Sheets-Sheet 5

Patented June 19, 1973 3,740,492

6 Sheets-Sheet 6

CARTRIDGE AND TAPE STRETCH PLACEMENT WITH BREAKS FOR ONE OR BOTH REELS

This application is a continuation-in-part of my pending U.S. Patent application Ser. No. 223,552, filed Feb. 4, 1972, and having a common assignee herewith.

This invention relates generally to magnetic recording and/or reproducing apparatus, such as, video tape recording and reproducing apparatus (VTR), and more particularly is directed to improvements in such apparatus provided with an automatic tape loading and unloading device.

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface of the drum and being driven by a cooperating capstan and pinch roller and by suitable rotation of the take-up reel. In preparing such a video tape recording and reproducing apparatus for operation, the tape extending between the supply and take-up reels must be placed around or wrapped about at least a portion of the drum circumference so that the tape will be guided thereby with respect to the rotary magnetic head assembly. In the conventional apparatus, it has generally been necessary for the user to manuualoy thread the tape from the supply reel through various guide members, around the guide drum and between the capstan and pinch roller, and then back to the take-up reel. Further, upon the completion of the recording or reproducing of video signals on a particular magnetic tape, it has been necessary for the user to manually remove the tape from the guide drum and then to manually rotate the supply or take-up reel for returning the resulting loose tape thereto prior to the removal of the reels from the apparatus. The foregoing operations require considerable manual dexterity and are time consuming. If the tape is not properly threaded, damage to the tape and defective recording or reproducing of the signals may result. Further, if there is foreign matter on the user's fingers when handling the tape during the manual loading or unloading of the tape about the guide drum, such foreign matter can be transmitted to the tape and may adversely affect the fidelity of the recording or reproducing of the signals.

Automatic tape loading and unloading devices have been previously proposed to avoid the above mentioned disadvantages. A desirable automatic tape loading and unloading device for a video signal recording and/or reproducing apparatus is disclosed in detail in copending U.S. Patent application Ser. No. 113,988, filed Feb. 9, 1971, and having a common assignee herewith. In such automatic tape loading and unloading device, a rotatable support member, in the form of a ring, extends around the guide drum and carries a plurality of tape guides which define an arcuate guide path spaced from the drum, and a tape engaging member is also mounted on the rotatable support member and is movable with respect to the latter into and out of the arcuate guide path. In an inactive or starting condition of the device, the tape engaging member is displaced out of the guide path so as to engage the tape between the take-up and supply reels contained in a cassette or cartridge, and the tape engaging member is moved into the guide path upon turning of the rotatable support member during a loading operation to draw a loop of the tape from the cassette and to wrap one side of the loop about the guide drum while the other side of the loop is engaged by the tape guides and is maintained by the latter away from the surface of the guide drum. During the tape unloading operation of the device, the tape engaging member remains in the guide path during the major portion of its movement with the rotatable support member for unwrapping the tape from about the guide drum and, at the conclusion of the tape unloading operation, the tape engaging member is moved out of the guide path so as to permit the return or rewinding of the tape which constituted the loop on at least one of the reels within the cassette.

Another desirable automatic tape loading and unloading device is disclosed in U.S. Patent application Ser. No. 223,552, identified more fully above, as comprising a rotatable support ring turnable around the guide drum in an arcuate path that extends between the latter and the holder provided for receiving and positioning the cassette, a first tape engaging member for example, in the form of a tape guide pin carried by a lever which is swingable about a fixed pivot, and which is movable between an inactive position where it is engageable with the tape extending between the reels in the cassette and an operative position where the first tape engaging member draws an initial loop of the tape from the cassette across the rotatable ring between the holder and guide drum, and a second tape engaging member carried by the rotatable ring to move with the latter in the mentioned arcuate path for engaging the initial loop of tape formed by rhe first tape engaging member and further extending the loop for wrapping one side of the extended loop about at least a portion of the guide drum periphery for scanning by the rotary head or heads associated with the latter. The second tape engaging member carried by the rotatable support ring is preferably constituted by a pinch roller which, in addition to extending the loop and wrapping one side of the extended loop about the guide drum circumference in response to turning of the rotatable ring, is moved adjacent a capstan for cooperation with the capstan in driving the tape during recording and reproducing operations.

With either of the above described automatic tape loading and unloading devices, a recording or reproducing operation of the apparatus can be halted at any location along the tape, that is, with any quantities of tape wound on the supply and take-up reels in the cassette, and the tape can be unloaded from the guide drum and returned to the cassette for permitting removal of the latter from the apparatus without requiring the full rewinding of the tape onto the supply reel. When that particular cassette is again installed in the recording and/or reproducing apparatus and the loading and unloading device is operated to load the tape on the guide drum, it is desired that any subsequent recording or reproducing operation commence at a location on the tape corresponding exactly to the location along the tape at which the preceding recording or reproducing operation was terminated. If the foregoing is not attained, that is, if the portion of the tape wrapped about the periphery of the guide drum upon the operation of the loading device does not exactly correspond to the portion of the tape that was wrapped about the guide drum periphery at the commencement of a preceding unloading operation, then successive recording or reproducing operations of the apparatus will occur in respect to portions of the tape that are either overlapped or spaced apart along the tape.

Accordingly, it is an object of this invention to provide a magnetic recording and/or reproducing apparatus having an automatic tape loading and unloading device, as aforesaid, and in which the portion of the tape wrapped about the guide drum periphery at the conclusion of a loading operation of such device exactly corresponds to the tape portion wrapped about the guide drum periphery at the commencement of a preceding tape unloading operation.

Another object is to ensure that there is neither overlapping nor spacing of the portions of the tape subjected to successive recording or reproducing operations of an apparatus of the described character.

In accordance with an aspect of the invention, the foregoing objects are achieved by providing the recording and/or reproducing apparatus having an automatic tape loading and unloading device with a brake system for controlling the rotation of the tape reels within a cassette so that, during each loading operation of such device, the tape required for forming the loop to be wrapped about a portion of the guide drum periphery is drawn from only one of the reels and, during each unloading operation, the tape removed from engagement with the guide drum is rewound only on that one reel.

The above, and other objects, features and advantages of this invention, will be apparent from the following detailed description of illustrative embodiments thereof which is to be read in connection with the accompanying drawings, wherein.

Figure 1:
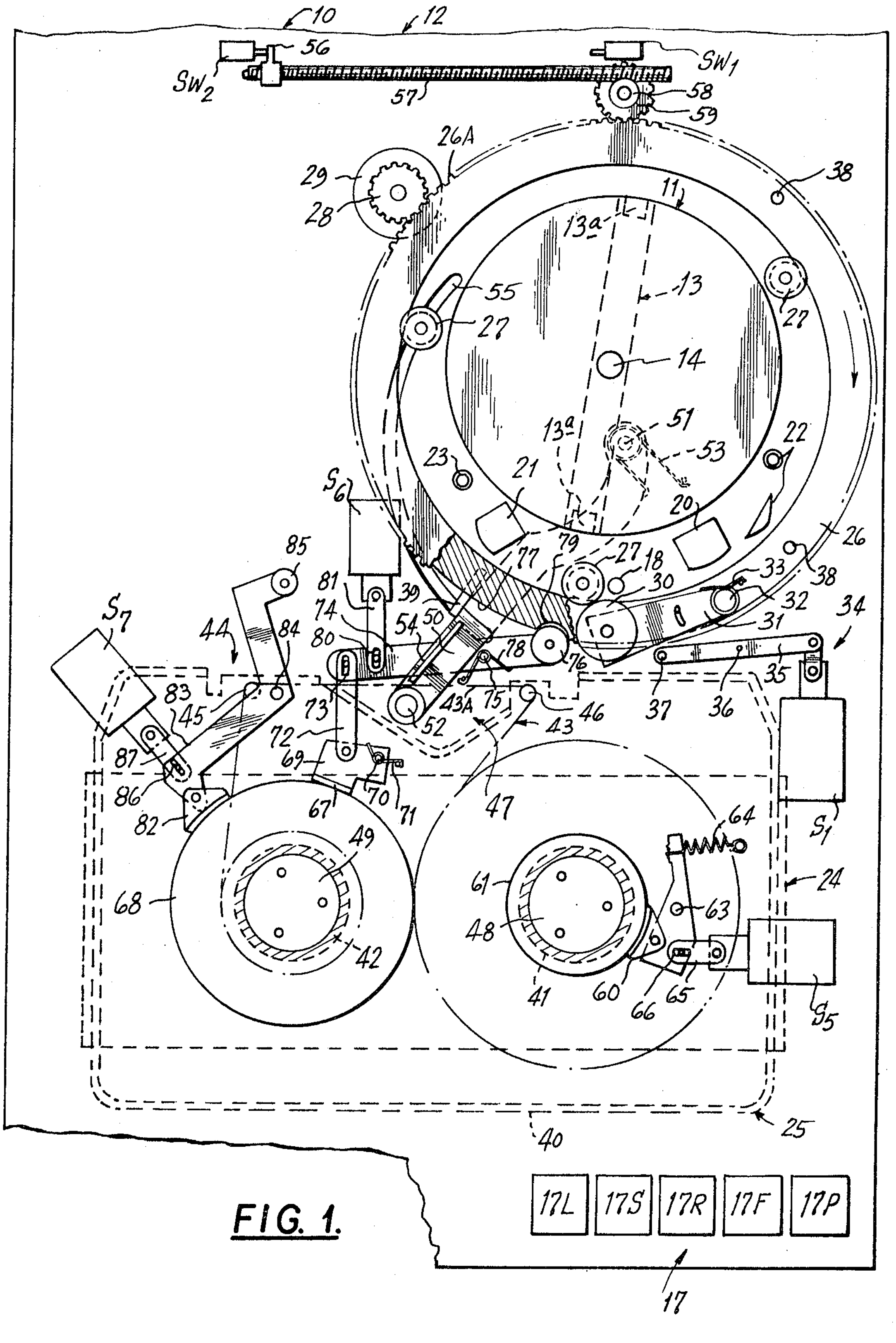
FIG. 1 is a schematic top plan view of a magnetic recording and/or reproducing apparatus having a tape loading and unloading device and provided with a braking system according to an embodiment of this invention, and which is shown with the apparatus in its stop condition.

Referring to the drawings in detail, and initially to FIG. 1 thereof, it will be seen that, in a magnetic recording and/or reproducing apparatus 10 according to this invention, as there illustrated, a cylindrical tape guide drum 11 is mounted on a chassis 12, preferably with the axis of drum 11 being preferably slanted forwardly from the vertical. The tape guide drum 11 includes upper and lower portions defining a circumferential slot therebetween, and the drum contains a rotary magnetic head assembly 13 made up of one or more magnetic heads 13*a* which are moved along the gap, that is, in a circular path substantially coinciding with the circumferential surface or periphery of drum 11. A shaft 14 extends downwardly from the magnetic head assembly 12 and is rotatable by a head drive assembly 15 (FIG. 6) which is powered by a main drive motor 16. The chassis 2 further carries a control button assembly 17 (FIG. 1) for example, made up of pushbuttons 17L, 17S, 17R, 17F and 17P, as shown, for selecting various operating modes of the recording and/or reproducing apparatus. More specifically, the control buttons may be selectively actuated or depressed for selecting the tape loading operation in the case of button 17L, for stopping any previously selected operation and initiating a tape unloading operation in the case of button 17S, for selecting the rewinding operation in the case of button 17R, for selecting the fast-forward operation in the case of button 17F, and for selecting the normal forward or play operation for recording or reproducing in the use of button 17P.

A capstan 18 (FIG. 1) which is suitably driven from the drive motor 16 through a capstan drive assembly 19 (FIG. 6), a fixed magnetic head 20 for recording and/or reproducing audio and control signals, an erasing head 21 and tape guides 22 and 23 are mounted on chassis 12 at predetermined spaced apart positions along the periphery or circumference of guide drum 11. A holder 24 is mounted on chassis 12 in front of tape guide drum 11 and is intended to receive and position a magnetic tape supply, for example, in the form of a tape cassette 25. In order to operate apparatus 10 for the magnetic recording and/or reproducing of signals on the tape, it is necessary to load the tape from cassette 25 on holder 24 about at least a portion of the circumferential surface or periphery of guide drum 11 for scanning by the rotary magnetic head assembly associated with the guide drum, and further to engage the magnetic tape with capstan 18 for driving by the latter and also with the fixed magnetic heads 20 and 21. When it is desired to remove the cassette 25 from the apparatus at the conclusion of a recording or reproducing operation, it is necessary to unload the tape from about drum 11 and to return the tape to the cassette 25.

In the apparatus 10, as shown, a device for performing the above described tape loading and unloading functions generally includes a support member 26 which is preferably in the form of a ring, as shown, and which is rotatable about guide drum 11 in a circular or arcuate path that extends between drum 11 and the holder 24. The support ring 26 may be disposed eccentrically with respect to guide drum 11, as shown on FIG. 1, to provide a relatively large space therebetween, at the front of drum 11, for accommodating capstan 18, heads 20 and 21 and tape guides 22 and 23. Further, support ring 26 is preferably mounted so that its plane of rotation is normal to the axis of guide drum 11, that is, so that such plane of rotation slants downwardly toward the front. Support ring 26 is rotatably supported by grooved rollers 27 which engage the inner periphery of ring 26 and which are suitably mounted above chassis 12. In order to effect turning of support ring 26 about drum 11 through approximately 360° between a first position shown on FIG. 1 and a second position shown on FIG. 3, the entire outer periphery of ring 26 is formed with gear teeth 26A which are meshed with a gear mechanism 28 connected to the rotated shaft of a reversible D.C. motor 29.

Figure 3:
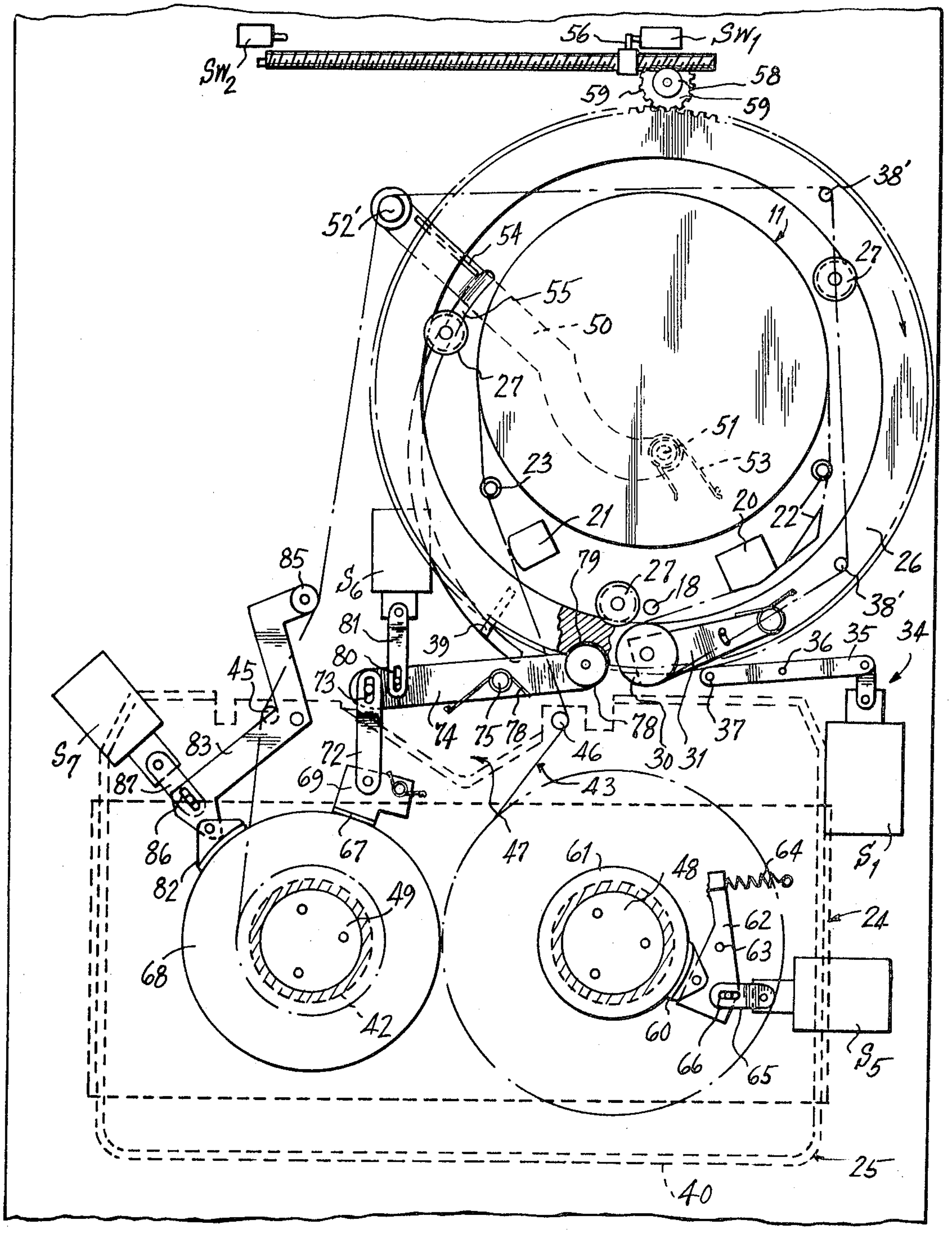

Extending upwardly from support ring 26, preferably normal to the plane of rotation of the latter, is a tape engaging member 30 which, in the illustrated apparatus, is a rotatable pinch roller which is located on ring 26 so that, when the support ring is turned from the position shown on FIG. 1 to the position shown on FIG. 3, the pinch roller 30 is located adjacent the rotary capstan 18 for cooperation with the latter in diriving a magnetic tape therebetween. The pinch roller 30 is shown to be rotatably mounted on the free end of an arm 31 which is pivoted at its other end, as at 32, on support ring 26. The arm 31 may be urged outwardly by a spring 33 to the position relative to ring 26 shown on FIGS. 1 and 3, whereby to normally provide a gap between capstan 18 and pinch roller 30, and a mechanism 34 is provided to swing arm 31 and engage pinch roller 30 with capstan 18, as shown on FIG. 4, in response to actuation of the control button 17P for initiating either a recording or a reproducing operation of the apparatus, as hereinafter described. As shown, the mechanism 34 may include a lever 35 swingable on a pivot 36 and carrying a pin 37 at one end. The other end of lever 35 is connected to the armature of a solenoid $S_1$ which, when energized, turns lever 35 from the position of FIG. 1 to the position of FIG. 4 so that pin 37 acts on arm 31 to swing the latter against the force of spring 33 and thereby press pinch roller 30 against capstan 18.

The support ring 26 further carries a plurality of tape guide members 38, for example, in the form of pins, which extend upwardly from ring 26 at spaced apart locations in trailing relation to pinch roller 30 considered in the clockwise direction of rotation of ring 26, as viewed on FIG. 1. An abutment member 39 depends from the underside of support ring 26 and is located along the latter so as to be positioned at the forward portion of ring 26 when the latter is in its first position shown on FIG. 1.

The tape cassette 25 intended for use in the magnetic recording and/or reproducing apparatus 10 may be of the type having a rectangular housing 40 containing rotatable supply and take-up reels 41 and 42 disposed side-by-side within the casing or housing and which have the magnetic tape 43 wound thereon. The housing or casing 40 has an opening 44 at the side thereof which faces rearwardly when cassette 25 is received by holder 24, and guides 45 and 46 are disposed at opposite sides of opening 44 for guiding a run of the tape 43 between reels 41 and 42 along a path that extends across opening 44. The bottom wall of cassette housing 40 has a cutout 47 which estends from the opening 44.

The holder 24 may be vertically movable between a raised position, where the holder is adapted to receive a cassette 25, and a lowered position at which the holder positions the cassette 25 in respect to the tape loading and unloading device and also in respect to rotatable reel support members 48 and 49 which extend above chassis 12. When holder 24 is lowered, such reel support members 48 and 49 project upwardly through suitable apertures in holder 24 and in the bottom wall of cassette housing 40 and engage in, and are rotatably coupled with the hubs of supply and take-up reels 41 and 42, respectively, of the cassette 25 positioned by holder 24.

The tape loading and unloading device of the apparatus 10 is further shown to include a lever 50 swingable about a fixed pivot 51 located under chassis 12 and offset from the center of rotation of support ring 26 and extending substantially radially with respect to the support ring so that the free end portion of lever 50 which is bent upwardly through an arcuate slot 55 projects beyond the outer periphery of ring 26. An upstanding tape engaging member or pin 52 extends from the free end of lever 50 to move more or less parallel to the arcuate path of support ring 26 between an inoperative or inactive position shown in full lines on FIG. 1 and an operative position indicated in full lines on FIGS. 3 and 4. A torsion spring 53 may be engaged with lever 50 to urge the latter to swing about its pivot 51 in the clockwise direction, as viewed on FIG. 1, whereby to urge tape engaging member 52 to its operative position which is determined by engagement of lever 50 with one end of the arcuate slot 55 formed in chassis 12. Further, the abutment 39 carried by support ring 26 is engageable with a flange 54 directed upwardly from the end portion of lever 50 so that, when support ring 26 is in its first or initial position, abutment 39 engages flange 54 to hold lever 50 in the position shown in full lines on FIG. 1 and thereby dispose tape engaging pin 52 in its inactive or inoperative position. It will be apparent that, when support ring 26 is turned in the clockwise direction, as hereinafter described, the resulting movement of abutment member 39 permits spring 53 to swing lever 50 from the position shown in full lines on FIG. 1 to the position shown in full lines on FIGS. 3 and 4.

In order to limit the rotational movements of support ring 26 for loading and unloading the tape with respect to guide drum 11, limit switches $SW_1$ and $SW_2$ (FIG. 1) are selectively actuable by an abutment 56 which is moved in accordance with the turning of ring 26. For example, as shown, abutment 56 may be threadably engaged by, and movable along a screw 57 which meshes with a worm 58 that is rotatably coupled with a gear 59 engaging the peripheral teeth 26A on ring 26. When ring 26 is in its first position (FIG. 1), for example, at the conclusion of counter-clockwise turning thereof during an unloading operation, abutment 56 engages limit switch $SW_2$ for opening normally closed contacts $SW_{2a}$ (FIG. 6) of that limit switch. Conversely, when ring 26 is turned clockwise from the position of FIG. 1 through approximately 360 degrees to the position of FIG. 3, for example, at the conclusion of a tape loading operation, abutment 56 engages limit switch $SW_1$ for opening normally closed contacts $SW_{1a}$ of latter.

Figure 6:
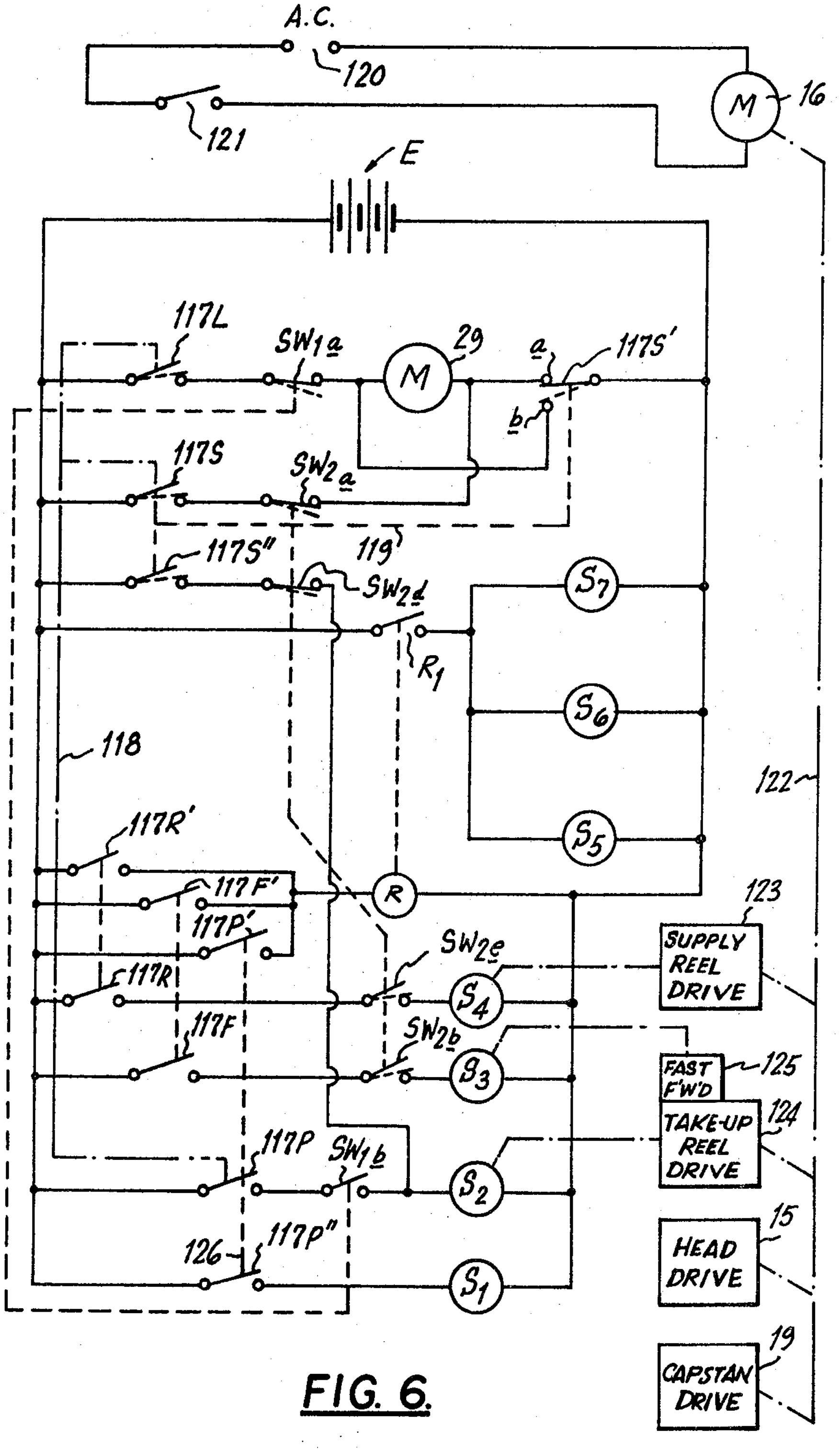
FIG. 6 is a schematic diagram of an electrical control system for controlling the tape loading and unloading device and braking system of a magnetic recording and/or reproducing apparatus according to this invention.

As shown on FIG. 6, it will be seen that the controls for apparatus 10 may comprise normally open operating mode selecting switches, for example, a "load" switch 117L, a "stop or unload" switch 117S, a "rewind" switch 117R, a "fast forward" switch 117F and a "play" switch 117P, which are selectively closed in response to the actuation of the control buttons 17L, 17S, 17R, 17F and 17P, respectively. Further, by means of conventional mechanical latching devices (not shown), each of the mode selecting switches may be held in its closed position following actuation of its respective control button, and such latching devices may be mechanically interconnected in a conventional manner and as schematically represented by the dot-dash line 118 on FIG. 6 so that, upon the actuation of any one of the mode selecting switches 117L, 117S, 117R, 117F and 117P to its closed position, any other one of such mode selecting switches previously held or latched in its closed position is released and returned to its normally open position. The switch 117S is further shown to be ganged or mechanically interconnected, as indicated by the broken line 119, with a reversing switch 117S' which closes its contact *a* when switch 117S is in its normal open condition, and which closes its contact *b* when switch 117S is actuated to its closed condition.

In the control circuit shown on FIG. 6, actuation of "load" switch 117L to its closed condition connects the reversible D.C. motor 29 for driving support ring 26 to the opposite terminals of a source E through closed switch 117L and limit switch contacts $SW_{1a}$, in series, and through contact *a* of reversing switch 117S' so that current flows through motor 29 in the direction for effecting clockwise rotation of support ring 26, as viewed on FIG. 1, until such time as abutment 56 engages limit switch $SW_1$ (FIG. 3) for opening the normally closed contacts $SW_{1a}$ of the latter. Conversely, when "stop or unload" switch 117S is actuated to its closed condition motor 29 is connected with the opposite terminals of source E through closed switch 117S and limit switch contacts $SW_{2a}$, in series, and through the closed contact *b* of reversing switch 117S', but, in this case, the current flows through motor 29 in the opposite direction so as to effect counterclockwise turning of support ring 26, as viewed on FIG. 3, until abutment 56 returns to the position shown on FIG. 1 to actuate switch $SW_2$ and thereby open its normally closed contacts $SW_{2a}$.

The above described tape loading and unloading device operates as follows:

With support ring 26 and the other elements of the apparatus in the positions thereof shown on FIG. 1, a cassette 25 is received and positioned by the holder 25 with the cassette opening 44 being disposed at the back of the cassette as placed on the holder and with the tape engaging member or pin 52 projecting upwardly through cutout 47 of the cassette housing 40 and being disposed in front of the run 43A of tape 43 extending between grids 45 and 46 in the cassette. The "load" switch 117L is then actuated to its closed position for initiating the loading operation. As a result of such actuation of switch 117L, motor 18 is operated in the direction for turning support ring 26 clockwise from the position shown on FIG. 1. During the initial rotation of support ring 26 in the clockwise direction, the corresponding movement of abutment 39 permits progressive turning of lever 50 in the clockwise direction by spring 53 so as to move tape engaging member 52 from the position on FIG. 1, through the position on FIG. 2 and to the operative position indicated at 52' on FIG. 3. It will be apparent that, during the movement of the tape engaging member to its operative position 52', the tape engaging member will draw tape from the cassette 25 and form the withdrawn tape into an initial loop 43B (FIG. 2) which extends across the arcuate path of support ring 26.

Due to the slanting plane of rotation of ring 26 which is lower at the front than at the back thereof, the pinch roller 30, when traversing the relatively low front portion of support ring 26, will move under the side of initial loop 43B which is closest to the center of ring 26. As clockwise rotation of ring 26 continues to move pinch roller 30 rearwardly within initial tape loop 43B (FIG. 2) the slanting plane of rotation of ring 26 will cause upward movement of pinch roller 30 into engagement with the side of loop 43B extending between tape engaging member 52 and guide 46. During continued rotation of support ring 26 in the clockwise direction beyond the position where lever 50 is arrested by its engagement against the end of slot 55, the pinch roller will act against the initial tape loop to further withdraw tape from cassette 25 and to progressively extend the tape loop. As the pinch roller moves from the position shown on FIG. 2 to the position shown on FIG. 3 as a result of continued rotation of support ring 26 in the clockwise direction, the side of the loop extending between tape guide 46 and the pinch roller is wrapped about at least a portion of the circumferential surface of guide drum 11 and, during such continued rotation of the support ring, the additional tape guides 38 move the tape loop at the front of the support ring and come into successive engagement with the side of the extended tape loop extending from the pinch roller to the tape guide 45, for example, as indicated at 38' on FIG. 3, so that each other side of the tape loop is held out of engagement or away from the circumferential surface of drum 11 by the guides 35' and by the tape engaging member 52'.

When the pinch roller has attained the position indicated on FIG. 3, abutment 56 actuates switch $SW_1$ to open the contacts $SW_{1a}$ of the latter and thereby halt the operation of motor 29 and the turning of support ring 26 at the completion of the tape loading operation. Upon the conclusion of the tape loading operation, that is, when the pinch roller has attained the position indicated on FIG. 3, the pinch roller is adjacent capstan 18 for cooperation with the latter in driving the tape in response to the actuation of the control button 117P for initiating a recording or reproducing operation as hereinafter described. It will further be seen that, at the conclusion of the tape loading operation, the tape extending between tape guide 46 in cassette 25 and the circumferential surface of guide drum 11 is engaged successively with erasing head 21 and the adjacent tape guide 23, whereas the tape extending between the circumferential surface of guide drum 11 and the pinch roller is successively engaged with the tape guides 22 and the fixed head 20 for recording and/or reproducing audio and/or control signals.

When it is desired to unload the tape from guide drum 11 and return the tape to within cassette 25, "stop or unload" switch 117S is manually actuated to its closed position. Thus, motor 29 is energized through closed switch 117S and limit switch contacts $SW_{2a}$, in series, and through closed contacts *b* of reversing switch 117S' so as to operate motor 29 in the direction for causing counterclockwise rotation of support ring 26. Further, as hereinafter described, during the counterclockwise or reverse turning of support ring 26, take-up reel 42 is rotated to wind the tape thereon. Thus, as the pinch roller moves with ring 26 in the counterclockwise direction, the tape loop is shortened and the excess tape created by shortening of the tape loop is rewound upon the take-up reel 42. After the counterclockwise turning of support ring 26 has progressed to the point where abutment 39 engages flange 54 on lever 50, the lever 50 is turned in the counterclockwise direction in response to further turning of ring 26 and the pinch roller 30 moves out of the small tape loop that remains under the side of that small tape loop extending between tape engaging member 52 and tape guide 46. Finally, when support ring 26 has been returned to its first or initial position, abutment 56 actuates switch $SW_2$, as shown on FIG. 1, whereby to interrupt the circuit for energizing motor 29 and thereby halting the turning of support ring 26 in the counterclockwise direction.

Continuing with the description of the control circuits for the apparatus 10 as shown on FIG. 6, it will be seen that the drive motor 16 is connected to an A.C. source 120 through a normally open switch 121 which may be suitably mounted under cassette holder 24 so as to be closed in response to the positioning of a cassette 25 in the holder. Thus, motor 16 is rendered operative when a cassette is placed in its operative position on holder 24. The shaft of motor 16 is connected, as indicated schematically at 122 on FIG. 6, to the head drive assembly 15 for driving the rotary magnetic heads associated with tape guide drum 11 and to the capstan drive assembly 19 for driving the capstan 18; and further to a supply reel drive assembly 123 which, when rendered operative as hereinafter described, drives the reel support member 48, and hence the supply reel 41 of the operatively positioned cassette at high speed in the direction for winding the tape thereon, as during a fast rewinding operation; and to a take-up reel drive assembly 124 which, when rendered operative as hereinafter described, drives the reel support member 49, and hence the take-up reel 42 of the cassette, in the direction for winding the tape thereon either at a relatively slow speed, as during a recording or reproducing operation of apparatus 10, or at a high speed, as during a fast-forward operation which occurs when a fast-forward control 125 of the take-up reel drive assembly is actuated, as hereinafter described. Thus, when the cassette 25 is operatively positioned on holder 24, the rotary heads associated with guide drum 11 and the capstan 18 are rotated, and rotary power is supplied to supply reel drive assembly 123 and to take-up reel drive assembly 124 by motor 16.

Preferably, in the illustrated apparatus 10, the take-up reel drive assembly 124 may be rendered operative to drive take-up reel 42 at the normal speed only after ring 26 arrives at its operative position, that is, only when the tape is wrapped about drum 11. For example, as shown on FIG. 6, take-up reel drive assembly 124 may be rendered operative to drive take-up reel 42 at the normal relatively slow speed for recording or reproducing signals on the tape only upon energizing of a solenoid $S_2$ which is connected to voltage source E through "play" switch 117P in series with normally open switch contacts $SW_{1b}$ of limit switch $SW_1$ which are closed at the conclusion of a tape loading operation (FIG. 3). Thus, after the completion of a tape loading operation, actuation of "play" switch 117P to its closed position will complete the circuit for energizing solenoid $S_2$ through the closed contacts $SW_{1b}$, and energized solenoid $S_2$ will actuate take-up reel drive assembly 124 for causing the take-up reel 42 to be rotated. The energization of the solenoid $S_1$ for controlling the engagement of pinch roller 30 with capstan 18 is also preferably affected only upon the actuation of "play" switch 117P. For example, as shown, the circuit for energizing solenoid $S_1$ may include a normally open switch 117P'' which is ganged with "play" switch 117P, as indicated at 126, so that switch 117P'' is closed simultaneously with switch 117P after the completion of the loading operation. The energizing of solenoid $S_1$, as previously described, moves pinch roller 30 against the adjacent rotated capstan 18 so that the tape therebetween is driven by capstan 18 and then taken up by the rotated take-up reel 42.

The switches 117F and 117R are shown to control the energization of respective solenoids $S_3$ and $S_4$ which are provided for effecting operation of the fast forward control 125 and the supply reel drive assembly 123, respectively. Thus, the fast forward control 125 is actuated in response to energization of solenoid $S_3$ for causing the take-up reel drive assembly 124 to effect the relatively high speed rotation of take-up reel 42. Similarly, the supply reel drive assembly 123 is rendered operative to effect the high speed rewinding of the tape on supply reel 41 only upon the energizing of solenoid $S_4$.

In order to ensure that the fast forward or rewinding operations of apparatus 10 can only occur with ring 26 of the tape loading device in its inoperative position (FIG. 1) that is, with the tape removed from guide drum 11 and wholly contained within the cassette 25, the control circuits of FIG. 6 are shown to include normally open switch contacts $SW_{2b}$ and $SW_{2c}$ which are respectively connected in series with switches 117F and 117R in the circuits for energizing solenoids $S_3$ and $S_4$. The switch contacts $SW_{2b}$ and $SW_{2c}$ are included in limit switch $SW_2$ so as to be actuated to their closed positions, indicated in broken lines on FIG. 6, only when ring 26 is in its inoperative position (FIG. 1) where abutment 56 actuates limit switch $SW_2$.

It will be apparent that, in the apparatus 10 as described above, a fast-forward or rewind operation is terminated by actuating the "stop or unload" switch 117S so as to release the latch holding the previously actuated "fast-forward" or "rewind" switch 117F or 117R in its closed position. Since ring 26 is already in its inoperative position (FIG. 1) during the fast-forward or rewind operation, switch contact $SW_{2a}$ is opened by the engagement of abutment 56 with limit switch $SW_2$ and, therefore, the actuation of "stop" switch 117S to terminate a fast-forward or rewind operation will not cause energization of motor 29 or rotation of ring 26.

Similarly, a play operation of apparatus 10 is terminated by actuation of "stop or unload" switch 117S. In this case, the actuation of switch 117S causes release of the latch holding "play" switch 117P in its actuated or closed position, and the closing of switch 117S causes energization of motor 29, as previously described, for unloading the tape from guide drum 11. During such unloading of the tape from guide drum 11, it is desired that the resulting tape slack be taken-up, preferably by rotation of the take-up reel 42. Thus, in the control circuits illustrated on FIG. 6, an alternate circuit for energizing solenoid $S_2$ is shown to include a normally open switch 117S'' ganged with switch 117S and, in series therewith, normally closed switch contacts $SW_{2d}$ of limit switch $SW_2$. With the foregoing arrangement, when switch 117S is actuated to terminate a play operation, solenoid $S_2$ is energized, through closed switch 117S'' and switch contacts $SW_{2d}$, for actuating the take-up reel drive assembly 124, and thereby causing the take-up reel 42 to take up the tape being removed from guide drum 11 during the unloading operation. Upon the completion of the unloading operation, that is, when the tape is fully returned to cassette 25, limit switch $SW_2$ is actuated by abutment 56 to open contacts $SW_{2d}$ and thereby interrupt the energization of solenoid $S_2$ so that driving of the take-up reel is halted.

Therefore, upon the termination of a "play" operation of apparatus 10; the cassette 25 can be removed from holder 24 and replaced by another cassette, or the same cassette can be retained in holder 24 for a subsequent play operation which is achieved by first actuating "load" switch 117L to again draw the tape from the cassette and wrap the tape about guide drum 11, and then actuating "play" switch 117P. However, it is desired such subsequent "play" operation commence at a location along the tape that corresponds exactly to the location at which the preceding play operation was terminated. In accordance with the present invention the foregoing is achieved by ensuring that, during each tape loading operation, the tape for forming the loop that has one of its sides wrapped about a portion of the guide drum periphery is drawn or unwound from only one of the reels, for example, only from the take-up reel 42, and further by ensuring that, during each tape unloading operation, the tape removed from the guide drum 11 and returned to the cassette 25 is rewound only on the same reel, that is, only on the take-up reel 42.

Figure 4:
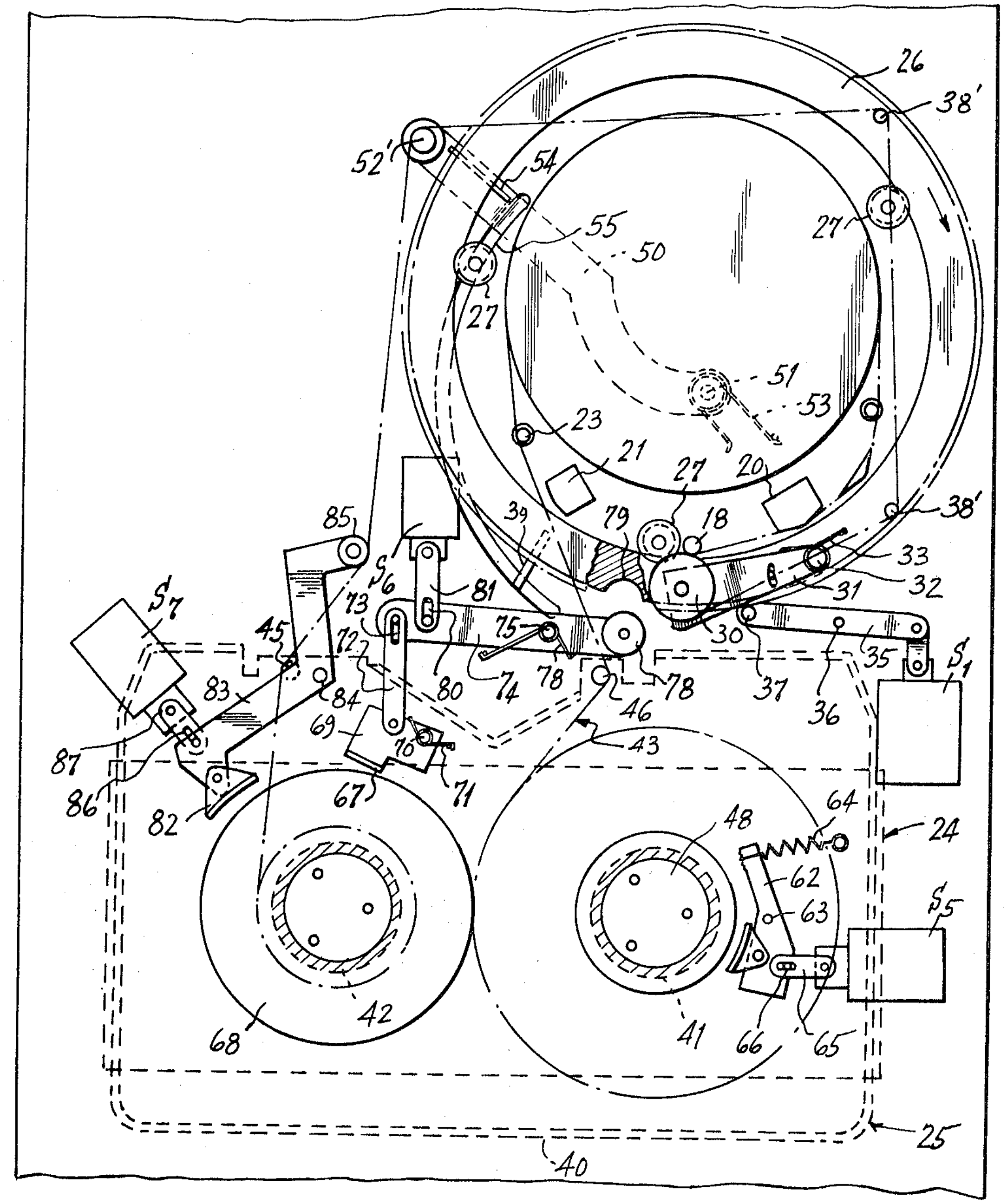
Figure 5:
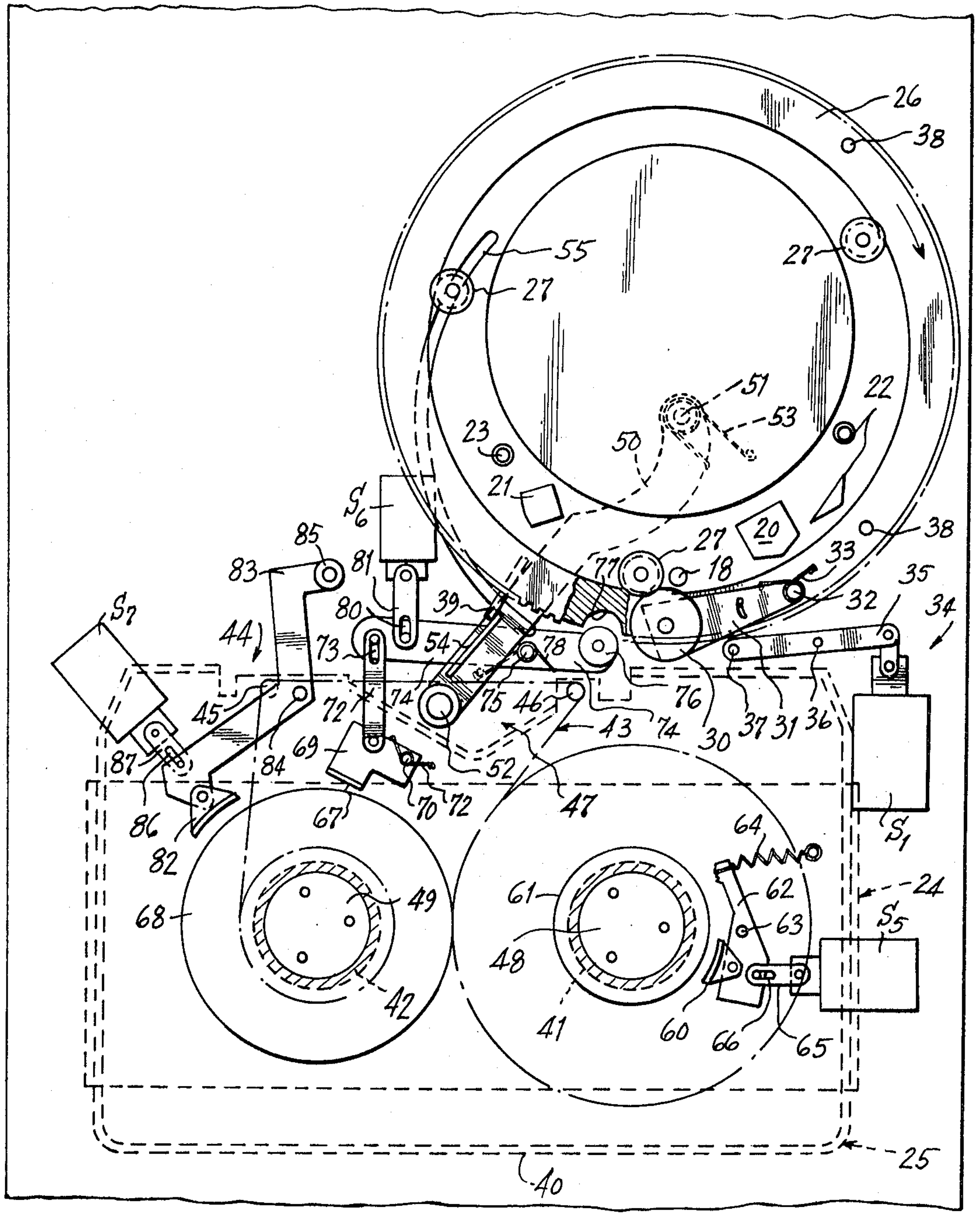

In order to ensure that the tape is unwound from, and rewound on only the take-up reel 42 during the tape loading and unloading operations, respectively, the apparatus 10 according to this invention is shown to have a brake member or shoe 60 frictionally engageable with a brake drum 61 on the reel support member 48 and being carried by a brake support lever 62 which is pivoted, as at 63, on chassis 12 (FIGS. 1–5). A spring 64 acts on lever 62 to urge the latter in the clockwise direction, as viewed on the drawings, and thereby urge brake member 60 against drum 61 for relatively strongly resisting rotation of reel support member 48 and hence of the supply reel 41 engaged therewith. A link 65 having a pin-in-slot or lost-motion connection 66 with lever 62 is connected to the armature of a solenoid $S_5$. When solenoid $S_5$ is deenergized, its armature is extended and, by reason of the lost-motion connection 66 does not interfere with the engagement of brake member 60 with drum 61 under the influence of spring 64 (FIG. 1). However, when solenoid $S_5$ is energized, as hereinafter described, its armature is retracted sufficiently to take up the lost motion in connection 66 between link 65 and lever 62 and to pivot lever 62 against the force of spring 64 for disengaging brake member 60 from brake drum 61 (FIGS. 4 and 5).

Another brake member 67, which is frictionally engageable with a brake drum 68 on the reel support member 49, is carried by a brake support arm 69 pivoted at 70 on chassis 12. A torsion spring 71 acts on arm 69 to urge the latter in the counterclockwise direction, as viewed on FIG. 1, for engaging brake member 67 with drum 68 and thereby relatively strongly resisting rotation of reel support member 49 and of the takeup reel 42 engaged therewith. A link 72 is pivotally connected, at one end, to brake support arm 69 and, at its other end, has a pin-in-slot or lost-motion connection 73 with one end of an actuating lever 74. The lever 74 is pivotally supported intermediate its ends, as on a pin 75, and the end of lever 74 remote from lost-motion connection 73 carries a rotatable roller 76 that is engageable with a circular surface 77 provided on the outer periphery of ring 26 below the teeth 26A on the latter. A torsion spring 78 acts on lever 74 to urge the latter in the counterclockwise direction, as viewed on FIG. 1, and thereby to urge roller 76 against surface 77. The surface 77 is shown to have an arcuate recess 79 which is located to receive roller 76, as on FIGS. 1 and 3, when support ring 26 is either in its inoperative or operative position, respectively.

When roller 76 is received in recess 79 (FIGS. 1 and 3), spring 78 pivots lever 74 in the counterclockwise direction and lost-motion connection 73 permits spring 71 to act on brake arm 69 for urging the brake member 67 thereof against brake drum 68. However, during a tape loading operation, that is, when ring 26 is turning from the position of FIG. 1 to the position of FIG. 3, or during the return rotation of ring 26 in the course of a tape unloading operation, roller 76 rides out of recess 79 onto circular surface 77 and pivots lever 74 to the position shown on FIG. 2. Such pivoting of lever 74 is sufficient to take up the lost-motion of connection 73 and to angularly displace brake arm 69 against the force of spring 71 for disengaging brake member 67 from brake drum 68. The lever 74 is further shown to be connected, through a pin-in-slot or lost-motion connection 80, with a link 81 which is in turn connected with the armature of a solenoid $S_6$. When solenoid $S_6$ is deenergized and has its armature extended, the lost-motion connection 80 permits the pivoting of lever 74 between the positions shown in FIGS. 1 and 2. However, when solenoid $S_6$ is energized, its armature is sufficiently retracted to take up the lost motion of connection 80 and of connection 73 and to pivot brake arm 69 for disengaging its brake member 67 from brake drum 68 even though ring 26 is positioned to register recess 79 with roller 76, as on FIGS. 4 and 5.

An additional brake member 82 is provided for frictional engagement with brake drum 68 and is mounted at one end of a lever 83 which is pivotally supported, as at 84, and carries a tape engaging pin or roller 85, at its other end. As shown on FIGS. 2 and 3, the lever 83 is shaped so that, when a loop of tape is withdrawn from cassette 25 and has one side of the loop wrapped about a portion of the periphery of guide drum 11 during a tape loading operation, as described above, the other side of the tape loop is engaged, from its outer side, by roller 85. Thus, during a tape loading operation (FIG. 2), the tension in the tape loop urges roller 85 outwardly, that is, toward the left as viewed on FIG. 2, for pivoting lever 83 in the counterclockwise direction and thereby urging brake member 82 into frictional engagement with brake drum 68. The lever 83 is connected, as by a pin-in-slot or lost-motion connection 86 with a link 87 which is, in turn, connected to the armature of a solenoid $S_7$. When solenoid $S_7$ is deenergized and has its armature extended, as on FIGS. 2 and 3, the lost-motion connection 86 permits the lever 83 to respond to the tension in the engaged tape loop without interference from solenoid $S_7$. However, when solenoid $S_7$ is energized, its armature is sufficiently retracted to take-up the lost motion of connection 86 and to pivot lever 83 for disengaging brake member 82 from drum 68 even though roller 85 is still acted upon by the tape loop under tension, as on FIG. 4.

Referring again to FIG. 6, it will be seen that the solenoids $S_5$, $S_6$ and $S_7$ are connected in parallel with each other and in series with normally open contacts $R_1$ of a relay R so that such solenoids are all energized simultaneously from voltage source E only when the coil of relay R is energized. Further, it will be seen that the circuit for energizing the coil of relay R from voltage source E includes parallel-connected, normally open switches 117R', 117F' and 117P' which are ganged with the "rewind" switch 117R, the "fast forward" switch 117F and the "play" switch 117P, respectively. Thus, relay R is energized to close its contacts $R_1$ and thereby cause energization of solenoids $S_5$, $S_6$ and $S_7$, whenever any one of switches 117R, 117F and 117P is actuated to its closed position for similarly closing the respective switch 117R', 117F' or 117P'. It will be apparent from the foregoing that the solenoids $S_5$, $S_6$ and $S_7$ are all normally deenergized, and are simultaneously energized only during a rewinding operation, a fast-forward operation or a play operation of apparatus 10.

Figure 2:
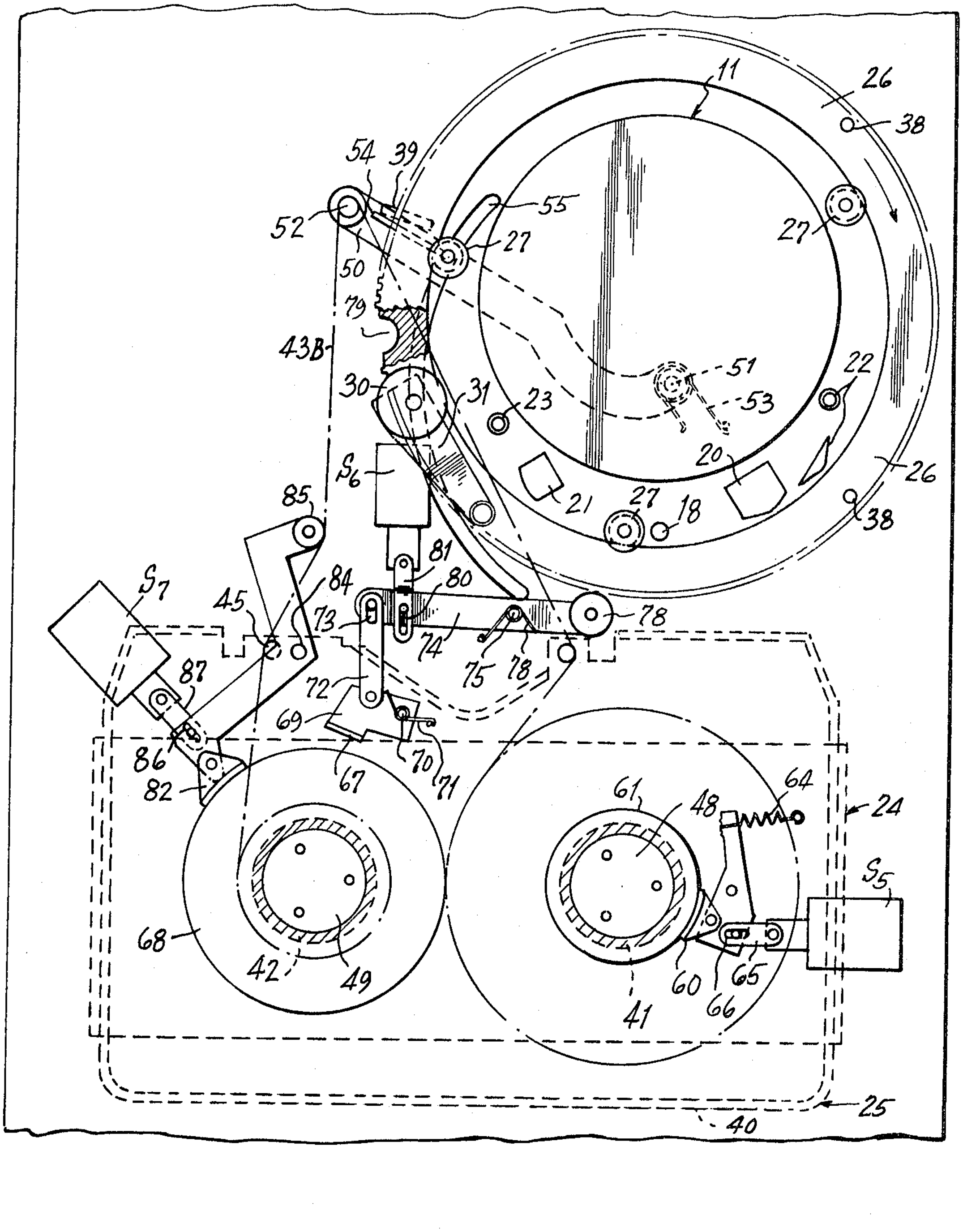
FIGS. 2–5 are views similar to that of FIG. 1, but showing the apparatus in other operating conditions thereof.

The magnetic recording and/or reproducing apparatus 10 having the automatic tape loading and unloading device and brake arrangement as described above operates as follows:

During a loading operation, all of the solenoids $S_5$, $S_6$ and $S_7$ are deenergized. Thus, brake member 60 is relatively strongly applied against brake drum 61 to strongly resist rotation of supply reel 41 engaged or coupled with reel support member 48. Immediately upon the turn of support ring 26 in the clockwise direction from the position shown on FIG. 1, recess 79 moves away from roller 76 so that the latter engages circular surface 77 and the resulting pivoting of lever 74 moves brake member 67 away from brake drum 68 (FIG. 2) to permit rotation of take-up reel 42 coupled with reel support member 49. Thus, the tape withdrawn from cassette 25 to form the previously described tape loop in the course of the tape unloading operation is withdrawn or unwound only from take-up reel 42. As such tape loop is being formed, the side of the tape loop extending from guide 45 engages roller 85 on lever 83, whereby the tension in the tape loop serves to relatively lightly apply brake member 82 against brake drum 68 for imposing a frictional drag on the latter that prevents the development of slack in the tape loop as the latter is being formed in the course of a tape loading operation (FIG. 2). At the completion of the tape loading operation (FIG. 3), recess 79 provided in support ring 26 is again positioned to receive roller 76 so that spring 71 can return brake arm 69 to the position where its brake member 67 is again frictionally engaged with brake drum 68 for holding the take-up reel 42 against rotation.

After the tape loading operation has been completed, the actuation of "play" switch 117P to initiate a play operation, that is, either a recording or reproducing operation of apparatus 10, results in the energization of all of the solenoids $S_5$, $S_6$ and $S_7$, so that brake member 60 is disengaged from brake drum 61 and brake members 67 and 82 are disengaged from brake drum 68, whereby to avoid interference with the unwinding of the tape from supply reel 41 and the winding up of the tape on take-up reel 42 in accordance with the normal play operation of the apparatus. Whenever the play operation is terminated, the opening of "play" switch 117P is accompanied by the opening of the related switch 117P′ for deenergizing relay R and thereby also deenergizing solenoids $S_5$, $S_6$ and $S_7$. Thus, brake members 60, 67 and 82 are immediately returned to the positions shown on FIG. 3 for holding the supply and takeup reels against rotation at the conclusion of the play operation.

When the "stop" switch 117S is actuated, for example, to terminate a preceding play operation, and further to initiate a tape unloading operation, the initial turning of ring 26 in the counterclockwise direction from the position shown on FIG. 3 moves recess 79 away from roller 76 and thereby causes brake member 67 to be disengaged from brake drum 68. Thus, during the tape unloading operation, reel support member 49 and the take-up reel 42 coupled therewith are free to be rotated by take-up reel drive 124 which is actuated by the energizing of solenoid $S_2$ through the closing of switch 117S″. Therefore, as the tape loop is reduced in size in the course of the tape unloading operation, take-up reel 42 is free to be rotated for winding thereon the resulting slack tape. At the same time, brake member 60 is tightly engaged with brake drum 61 to securely prevent rotation of supply reel 41. Thus, during the tape unloading operation, all of the tape returned to the cassette 25 is rewound on take-up reel 42.

With all of the tape contained within cassette 25, the actuation of "rewind" switch 117R or of "fast-forward" switch 117F for respectively initiating a rewind or fast-forward operation of apparatus 10 is accompanied by the closing of the related switch 117R′ or 117F′ so as to energize relay R and thereby energize the solenoids $S_5$, $S_6$ and $S_7$. Thus, as shown on FIG. 5, the brake members 60, 67 and 82 are all disengaged from the respective brake drums during either a rewinding operation or a fast-forward operation of apparatus 10 and avoid any interference with the rapid transfer of the tape between the reels 41 and 42.

Since the tape withdrawn from cassette 25 during a tape loading operation is unwound only from take-up reel 42, and since the tape returned to the cassette during a subsequent tape unloading operation is rewound only on take-up reel 42, it is clear that the portion of the tape which is wrapped about a portion of the periphery of tape guide drum 11 at the conclusion of a succession of tape loading and unloading operations will be unchanged. Thus, successive play operations can be performed without the danger that the location along the tape at which one play operation commences will either overlap, or be spaced from the location along the tape at which a preceding play operation was terminated.

In the event that the cassette 25 is initially placed in holder 24 with all of the tape wound on supply reel 41, that is, with no tape, or insufficient tape remaining on take-up reel 42 for the formation of a tape loop during a tape loading operation, then breakage of the tape by the action of the tape engaging member 52 and the pinch roller 30 against the tape is avoided by slippage of the brake drum 61 past brake member 60. In order to permit such slippage only under the described conditions, the force of spring 64 is selected to be sufficient for generating a braking froce that more than overcomes the torque exerted on supply reel 41 and the respective reel support member 48 as a result of the tension in the tape 43 from the frictional drag of brake 82 during a loading operation except when the diameter of the tape wound on reel 41 approximates that corresponding to the condition where all of the tape is wound on the supply reel.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. An apparatus for magnetically recording and/or reproducing signals on a magnetic tape which is wound on, and extends between first and second reels, comprising a cylindrical tape guide drum having at least one rotary magnetic head associated therewith for movement in a circular path substantially coinciding with the periphery of said drum, reel support and drive means engageable with said reels and being operable for rotating a selected one of said reels in the direction for winding the tape thereon, tape loading and unloading means engageable with the tape between said reels and being selectively operable in a tape loading operation for engaging the tape between the reels with a portion of said periphery of the guide drum for scanning by said rotary head, and in an unloading operation for removing said tape between the reels from said portion of the guide drum periphery, braking means engageable with said reel support and drive means for normally arresting rotation of said first and second reels engaged by said reel support and drive means, and brake control means effective during said loading and unloading operations for releasing said braking means only in respect to said second reel so that the tape is unwound only from said second reel during said loading operation and rewindable only upon said second reel during said unloading operation.

2. An apparatus according to claim 1; further comprising means imposing a frictional resistance to the unwinding of the tape from said second reel during said loading operation.

3. An apparatus according to claim 1; in which said reel support and drive means includes first and second rotatable reel support members respectively engageable with said first and second reels, first drive means actuable for rotating said first reel support member in the direction for winding the tape on said first reel during operations of the apparatus requiring the transfer of the tape from said second reel to said first reel, and second drive means actuable for rotating said second reel support member in the direction for winding the tape on said second reel during operations of the apparatus requiring the transfer of the tape from said first reel to said second reel and during said unloading operation of said tape loading and unloading means; and in which said braking means includes first and second brake members engageable with said first and second reel support members, respectively, and said brake control means disengages said first and second brake members from said first and second reel support members during said operations of the apparatus which require the transfer of the tape from one to the other of said reels, and said brake control means further disengages only said second brake member from said second reel support member during said loading and unloading operations of said tape loading and unloading means.

4. An apparatus according to claim 3; in which said braking means further includes a third brake member engageable with said second reel support member during said loading operation for imposing a frictional drag on the unwinding of the tape from said second reel.

5. An apparatus according to claim 4; in which said brake control means further includes means for disengaging said third brake member from said second reel support member during said operations of the apparatus which require the transfer of the tape from one to the other of said reels.

6. An apparatus according to claim 3; in which said braking means further includes movable mounting means for said first and second brake members and spring means acting on said mounting means for urging said first and second brake members into engagement with said first and second reel support members; and in which said brake control means includes electromagnetic means connected with said movable mounting means and being energized upon said operations of the apparatus which require the transfer of the tape from one to the other of said reels for disengaging said first and second brake members from said first and second reel support members, and means responsive to said loading and unloading operations of said tape loading and unloading means for moving said mounting means of said second brake member in the direction to disengage the latter from said second reel support member.

7. An apparatus according to claim 6; in which said tape loading and unloading means includes a support ring rotatable about said guide drum from a first position to a second position during said loading operation and from said second position back to said first position during said unloading operation; and in which said means responsive to said loading and unloading operations for moving said mounting means of the second brake member in the disengaging direction includes lever means connected with said mounting means of the second brake member, and means on said support ring engageable by said lever means for holding said second brake member away from said second reel support member when said support ring is disposed between said first and second positions of the latter.

8. An apparatus according to claim 7; in which said tape loading and unloading means further includes first tape engaging means disposed in an inactive position where it is engageable with the tape between said reels in response to said support ring being in said first position thereof and being moved to an operative position for forming an initial loop in tape unwound from said second reel in response to movement of said support ring to said second position, and second tape engaging means carried by rotatable support ring to move with the latter for engaging said initial loop and further extending said loop for wrapping one side of the extended loop about said portion of the guide drum periphery.

9. An apparatus according to claim 8; in which said second tape engaging means includes a pinch roller rotatably mounted on said support ring to extend into said intial loop during movement of said support ring from said first position toward said second position; and further comprising a rotary capstan located to be adjacent said pinch roller in said second position of said support ring for cooperation with said pinch roller in driving the magnetic tape therebetween.

10. An apparatus according to claim 8; in which said braking means further includes a third brake member engageable with said second reel support member, and movable mounting means for said third brake member carrying means engageable with said tape loop for urging said third brake member against said second reel support member in response to tension in the tape of said loop.

11. An apparatus according to claim 10; in which said brake control means further includes electromagnetic means connected with said mounting means for said third brake member and being energized upon said operations of the apparatus which require the transfer of the tape from one to the other of said reels for disengaging said third brake member from said second reel support member.

12. An apparatus according to claim 1; in which said reels are contained in a cassette housing having an opening across which the tape is guided between said reels and through which the tape between the reels can be withdrawn from said housing; and in which said tape loading and unloading means includes tape engaging means movable in a path about said drum from a first position extending into said opening of the cassette housing to a second positon remote from said housing for withdrawing a loop of tape from the housing during said loading operation and returning from said second position to said first position during said unloading operation.

13. An apparatus according to claim 12; in which said tape loading and unloading means includes actuating means for effecting movements of said tape engaging means between said first and second positions of the latter; and in which said brake control means for releasing said braking means only in respect to said second reel includes means responsive to the movements of said tape engaging means between said first and second positions by said actuating means.

14. An apparatus according to claim 12; in which said braking means includes first and second brake members spring urged to their engaged conditions for arresting rotation of said first and second reels, respectively; and in which said brake control means includes electromagnetic means energizable for disengaging said first and second brake members simultaneously, and mechanical means actuable by said tape loading and unloading means for releasing said second brake member during movements of said tape engaging means between said first and second positions thereof.

15. An apparatus according to claim 14; in which said braking means includes a third brake means and actuating means for the latter engageable with said loop of tape withdrawn from the housing for imposing a frictional drag on said second reel during said loading operation, and said electromagnetic means, when energized, also effects disengagement of said third brake member.

* * * * *